United States Patent [19]

Meffert et al.

[11] Patent Number: 4,773,939

[45] Date of Patent: Sep. 27, 1988

[54] USE OF INSOLUBLE SOIL COLLECTORS FOR AT LEAST PARTIAL REGENERATION OF LAUNDERING AND CLEANING SOLUTIONS

[75] Inventors: Alfred Meffert, Monheim; Andreas Syldatk, Duesseldorf; Brigitte Giesen, Duesseldorf; Ingo Wegener, Duesseldorf, all of Fed. Rep. of Germany

[73] Assignee: Henkel Kommanditgesellschaft auf Aktien, Duesseldorf, Fed. Rep. of Germany

[21] Appl. No.: 18,106

[22] Filed: Feb. 20, 1987

[30] Foreign Application Priority Data

Feb. 22, 1986 [DE] Fed. Rep. of Germany ....... 3605716

[51] Int. Cl.[4] .............................................. B01D 37/00

[52] U.S. Cl. .......................................... 134/10; 8/137; 134/13; 210/679; 210/735; 210/807; 210/910; 252/90; 252/91; 252/179; 252/528; 252/547

[58] Field of Search ...................... 8/137, 142; 134/10, 134/13; 252/90, 91, 547, 528, 179; 210/679, 735, 807, 910

[56] References Cited

U.S. PATENT DOCUMENTS

| | | | |
|---|---|---|---|
| 3,472,840 | 10/1969 | Stone | 260/231 |
| 3,589,978 | 6/1971 | Kamal | 162/158 |
| 3,632,559 | 1/1972 | Matter | 525/430 |
| 3,694,364 | 9/1972 | Edwards | 252/90 |
| 3,816,321 | 6/1974 | Kleinschmidt | 252/134 |
| 3,864,317 | 2/1975 | Ogata | 260/79.3 M |
| 3,910,862 | 10/1975 | Barabas | 525/326.9 |
| 3,912,808 | 10/1975 | Sokol | 424/71 |
| 4,066,394 | 1/1978 | Leonard | 8/137 |
| 4,148,603 | 4/1979 | Schwuger | 8/137 |
| 4,157,388 | 6/1979 | Christiansen | 424/70 |
| 4,240,450 | 12/1980 | Grollier | 132/7 |
| 4,255,148 | 3/1981 | Reinwald | 8/137 |
| 4,272,515 | 6/1981 | Hofman | 424/70 |
| 4,292,212 | 9/1981 | Melby | 252/547 |
| 4,557,854 | 12/1985 | Plueddemann | 252/174.15 |
| 4,576,744 | 3/1986 | Edwards | 252/554 |

FOREIGN PATENT DOCUMENTS

| | | |
|---|---|---|
| 0021011 | 5/1980 | European Pat. Off. . |
| 0071148 | 7/1982 | European Pat. Off. . |
| 0115252 | 12/1983 | European Pat. Off. . |
| 0153146 | 8/1985 | European Pat. Off. . |
| 2727255 | 12/1977 | Fed. Rep. of Germany . |
| 2731080 | 1/1978 | Fed. Rep. of Germany . |

*Primary Examiner*—Paul Lieberman
*Assistant Examiner*—Kathleen Markowski
*Attorney, Agent, or Firm*—Ernest G. Szoke; Henry E. Millson, Jr.; Real J. Grandmaison

[57] ABSTRACT

The process of regenerating a soil-laden detergent solution comprising contacting said solution with a soil collector comprising a polyfunctional quaternary ammonium compound which is at least substantially insoluble in the solution and/or immobilized on a solid correspondingly insoluble in the solution.

22 Claims, No Drawings

USE OF INSOLUBLE SOIL COLLECTORS FOR AT LEAST PARTIAL REGENERATION OF LAUNDERING AND CLEANING SOLUTIONS

BACKGROUND OF THE INVENTION

1. Field of the Invention

This invention relates to the use of polyfunctional quaternary ammonium compounds which are substantially insoluble in aqueous detergent solutions and/or are immobilized on solids insoluble in such solutions, for the regeneration of soil-laden aqueous detergent solutions.

2. Discussion of the Related Art

The subject of prior International Patent Application PCT/EP/86/753 is the use of polyfunctional quaternary ammonium compounds (PQUATS) which are insoluble in aqueous-surfactant laundering and cleaning solutions even under the temperature loads of the laundering process, and/or are present in immobilized form such that they cannot be washed off from solids appropriately insoluble in these aqueous solutions, as particulate soil-collecting cleaning enhancers in aqueoussurfactant laundering and cleaning solutions, which following the laundering or cleaning of the material to be cleaned, can be removed manually and/or mechanically from the cleaning solution. In this prior application, the laundering power enhancement of the customary aqueous-alkaline textile laundry detergent solutions by the simultaneous use of such PQUAT soil collectors is especially described. At least a considerable fraction of the soil solubilized during textile laundering, especially the pigmented soil, is taken up by the PQUAT present in the solid phase, and thus is ultimately transferred from the originally soiled textile material to to be cleaned to the soil collector. An increase in the reflectance value of the laundered material can be established in the laundering result in this way under selected conditions.

The present teaching extends the novel application of such PQAUTS in that improvements are not only achieved in terms of the laundering result on the textile to be cleaned; in addition, new possibilities are pointed out for using surfactant laundering and cleaning solutions of the type mentioned more effectively and more economically. The teaching in accordance with the invention especially creates the possibility of reuse, possibly of repeated reuse, of the aqueous phase of soiled cleaning baths, in that by treating these baths with the insoluble or immobilized PQUATS mentioned in the earlier application cited above, the soil solubilized in the bath is at least partially precipitated on the undissolved PQUAT, and thus the contaminated cleaning bath is at least partly freed from its soil load. Part or all of the aqueous bath treated in this way can be taken for reuse for new cleaning operations. It is apparent that important advantagaes in several regards are achieved in this way. On one hand, the economy of such cleaning processes can be increased through the reuse of chemical fractions which were previously discharged into the waste water together with the removed soil, and on the other hand it is possible in this way to achieve effective reduction of environmental pollution in the sense of protecting bodies of water against discharged laundry chemicals. Even though a certain loss of chemicals is unavoidable, for example, the fraction of the surfactant that is lost when the textile material is rinsed, nevertheless the invention offers important advantages in the indicated way. Whereas previously the entire chemical load was introduced into the waste water system together with the soiled bath, according to the new process a considerable fraction is immobilized as the solid phase, and other dissolved fractions can be recycled in the aqueous bath.

DESCRIPTION OF THE INVENTION

Other than in the operating examples, or where otherwise indicated, all numbers expressing quantities of ingredients or reaction conditions used herein are to be understood as modified in all instances by the term "about".

Thus the subject of the present invention is the use of PQUATS which are at least substantially insoluble in aqueous laundering and cleaning solutions for the at least partial regeneration of soil-laden aqueous-surfactant cleaning baths, wherein this procedure is designed for the subsequent reuse of at least part of the purified laundering bath. The process in accordance with the invention is especially suitable for aqueous alkaline surfactant-containing cleaning baths of the type known, for example, as wash baths from textile laundering. Such soiled wash baths from textile laundering are treated in accordance with the invention with the insoluble or insolubly immobilized PQUATS, and thus are regenerated by removing at least part of the suspended soil from the used wash solution. Recycling of the wash bath with reuse in subsequent wash cycles is made possible by the fact that the PQUATS are present in the form of insoluble solids or immobilized on insoluble solids, and in addition are used in such a form that following the cleaning treatment, manual and/or mechanical separation between the soil-loaded PQAUT-solid phase and the treated wash bath is possible.

There are two basic embodiments for the regeneration of wash liquors according to the invention which may even be combined with one another. In the first embodiment, the soil-collecting PQUATS are added in heterogeneous solid phase to the wash liquor during its actual use as a detergent solution. This embodiment is the subject of the earlier application mentioned above, i.e., PCT/EP/86/753. Now, however, not only are the washed fabrics separated from the wash liquor and the soil-collecting PQUAT component, the wash liquor and the soil-collecting PQUAT are also separated to enable the surfactant-containing liquid phase regenerated in situ during the washing process to be reused.

In the other basic embodiment of the invention, a washing process, for example a fabric washing process, is first carried out in the usual way. The soiled wash liquor is then subjected to regeneration in accordance with the invention, after which the at least partly regenerated wash liquor may be completely or partly reused.

These two basic principles may be applied in any combination, the following embodiments being mentioned by way of example. Thus, PQUAT components according to the invention may be added to the wash liquor during the actual primary washing process and, after separation of the washed fabrics, the used wash liquor is subjected to an additional regeneration step with PQUATS. In a second embodiment, part of the wash liquor is run off in batches or continuously from the washing machine during the washing process and passed through a treatment zone wherein it is regenerated with heterogeneous PQUAT components in accordance with the invention, after which this partial stream may be completely or partly returned to the washing process. In this variant, use may be made in the main wash of the detergency-enhancing principle of jointly using heterogeneous PQUAT components. Equally, however, this principle need only be applied in the partial stream run off from the wash liquor.

The novel technical embodiment of the following concept is crucial both to this and to other possible variants of the teaching according to the invention. The washing process, for example in the washing of fabrics, may ideally be divided into two fields of activity. The first field of activity comprises the breaking up and removal of soil from the soiled fabric, while the second field of activity of the wash liquor used guarantees safe suspension of the soil removed in the wash liquor so that the soil removed may be completely rinsed out without redeposition on the fabric. It is particularly this second field of activity of standard fabric wash liquors which, hitherto, has necessitated the use of considerable excesses of chemical auxiliaries, for example surfactants, cosurfactants, soil suspending agents and the like. This aspect of the conventional washing process remains largely unaffected by the procedure according to the invention. The soil removed from the soiled fabric and suspended in the wash liquor is directly transferred from the wash liquor to the PQUAT soil collector. The soil-removing chemicals are not removed in this process, instead they are released for reuse in the soil-removing washing process. It is clear that the soil-removing chemicals required can be effectively reduced in this way, depending on their type and quantity. An additional, synergistic reduction in this effect emanates from the possibility afforded by the invention of reusing the wash liquor laden with chemicals, after it has been used for one washing process and then sufficiently regenerated, for another load of washing. If necessary, used washing chemicals may be fed into the wash liquor regeneration circuit continuously and/or in batches. The invention nevertheless affords significant improvements over the conventional procedure of discarding the soiled wash liquor with its overall excess of chemicals and draining if off into the wastewater.

By virtue of their cationic character, the PQUAT components present in accordance with the invention as a heterogeneous solid phase absorb in particular negatively charged particles, for example corresponding soil particles, from the soil-laden wash liquor. In addition, the solid PQUAT components, by virtue of other surface forces, can have a detergent or detergency-enhancing effect. The other important embodiments of the invention described hereinafter are particularly based on the fact that not only negatively charged soil particles have to be removed from soiled wash liquors.

In a conventional washing process, oil or greasy soil, for example, is hydrophilized to such an extent that it is dissolved in the wash liquor. In one important embodiment of the invention, an auxiliary material distinguished by a high absorption capacity for oleophilic soil is used together with the soil-collecting PQUATS, likewise in heterogeneous solid phase. It is known that selected plastics, for example polyethylene, polypropylene and polyurethane, or even surface-hydrophobicized insoluble solids of any origin, are capable of absorbing the oleophilic soil hydrophilized by surfactants from a wash liquor and retaining it at their surface. This action principle is also applied in this embodiment for effectively regenerating soiled wash liquors. The collectors for oleophilic soil may be used for example in the form of flakes, fibers or fibrous materials, such as cloths, nonwovens, poromer sheets and the like. The only important requirement for this component is the requirement previously stated for the PQUAT collectors, namely that manual and/or mechanical separation should be possible between the liquid phase and the soil collector present in solid phase.

The auxiliaries collecting oleophilic soil may be used during and/or separately from the treatment of the wash liquor with PQUATS. The particular working conditions are determined by the nature of the soil in the wash liquor and by the expected loading of the solid, soil-collecting auxiliaries.

In another important embodiment of the invention, polyanionic washing aids are used as a separate solid phase in addition to the polycationic PQUATS and the oleophilic soil-collecting solids. Polyanionic components in dissovled and/or undissolved form play an important role in modern detergents. Thus, they are used for example as builders and co-builders for the surfactants. They perform a number of different functions, including, for example, binding of the calcium and/or magnesium ions to reduce water hardness. This particular embodiment of the invention goes beyond the prior art.

By the joint use in accordance with the invention of insoluble polyanionic components, which like the previously discussed soil-collecting auxiliaries are jointly used in manually and/or mechanically separable form, it is possible to additionally remove positively charged soil components from the used wash liquor. Components such as these may be formed, for example, in the course of dye transfer or as decomposition products from bleaching processes. It is important to the teaching of the invention that the polycationic auxiliaries (PQUATS) used and the polyanionic auxiliaries discussed here cannot adversely affect one another. Both collectors are provided spatially separate from one another in the solid phase in such a way that each is able to develop its regenerating effect without being substantially affected by the oppositely charged collector.

The teaching according to the invention includes the simultaneous use of the PQUAT auxiliaries and the polyanionic insoluble auxiliary in the presence or even in the absence of the third collector component discussed above which is particularly suitable for taking up oleophilic soil from the wash solution.

Natural and/or synthetic solids containing a plurality of anionic acid groups are particularly suitable as the insoluble, polyanionic solid phase. Insoluble components, containing carboxyl groups, sulfonic acid groups, phosphonic acid groups and the like are mentioned as examples. It is known that a considerable enhancement of detergency in the primary washing process is attributed precisely to components of this type. The use of compounds of this type as water-soluble components in fabric detergents is now widespread, although certain reservations concerning their use do exist. In the embodiment under discussion here, the invention provides for the joint use of such components in the heterogenous solid phase, and at the same time, in such a form that these solids with their functional groups may be separated from the washing solution so that the uncontrolled release of corresponding compounds into the wastewater is basically avoided.

Polyfunctional quaternary ammonium compounds (PQUATS) have often been described in the prior-art literature and are also commercially available in various forms. One important application of compounds such as these is in cosmetic preparations, more especially for the treatment or rather conditioning of hair. One of the known characteristics of PQUATS is that they are capable of being absorbed onto solid surfaces, in particular even in the presence of standard surfactant components. The ability of PQUATS to be absorbed and to remain absorbed on solid surfaces differs according to their composition. The particular composition of the PQUATS plays a crucial part in this regard. Known PQUATS are generally oligomers and/or polymers which contain a majority or plurality of quaternary ammonium groups on their oligomeric or polymeric matrix. For cosmetic applications, PQUATS are generally required to show adequate solubility in water. By contrast, the use of PQUATS in accordance with this invention presupposes the insolubility or at least adequate insolubility of the PQAUT-based detergency enhancers used as soil collectors in the aqueous detergent solutions. Nevertheless, it is possible in one important embodiment of the invention to use any known water-soluble PQUAT components for the application according to the invention. To this end, the known, basically water-soluble and/or water-swellable PQUAT components merely have to be fixed to sufficiently water-insoluble carriers, and hence immobilized, in such a way that they cannot be washed off the carrier to any significant extent, if at all, during the washing process. As will be explained in detail hereinafter, various possibilities are available for this purpose. As will be explained in detail hereinafter, various possibilities are available for this purpose. However, this makes it clear that any of the polyfunctional quaternary ammonium compounds, particularly oligomeric and/or polymeric types, known form the prior art may also be used for the purposes of the invention.

Suitable polyfunctional quaternary ammonium compounds that may be employed in this invention include those mentioned, for example, in U.S. Pat. Nos. 3,589,978, 3,632,559 3,910,862, 4,157,388, 4,240,450 and 4,292,212; Great Britain Pat. No. 1,136,842; German Published Application No. 27 27 255 and U.S. Pat. No. 3,472,840 cited therein. More specifically, Great Britain Pat. No. 1,136,842 discloses quaternary ammonium galactomannan derivatives and their use in the formation of paper. The derivatives are quaternary ammonium galactomannan gum ethers wherein at least one hydroxyl group has been reacted with a quaternary ammonium compound such as 2,3 -epoxy- propyl trimethylammonium chloride or 3-chloro-2 hydroxypropyl trimethylammonium chloride.

U.S. Pat. No. 3,472,840 relates to quaternary nitrogen containing cellulose esters having a back-bone of anhydroglucose units with pendant substituent groups bearing a full positive charge spaced along the backbone.

U.S. Pat. No. 4,157,388 is directed to polycationic or polyquaternary ammonium ionenes useful as conditioning agents for hair and textiles.

U.S. Pat. No. 3,632,559 teaches cationically active, water soluble polyamides obtained by alkylation with a bifunctional alkylation agent until the alkylation agent is used up, of a reaction product resulting from the reaction of a dicarboxylic acid or a functional derivative thereof with a polyalkyenepolyamine.

U.S. Pat. No. 4,240,450 relates to compositions for the treatment of keratin material, in particular human hair, comprising a combination of a cationic polymer with an anionic polymer. The anionic polymer contains at least one of a sulfonic acid, carboxylic acid, and phosphoric acid unit, and has a molecular weight of from about 500 to 5 million. The cationic polymer may contain primary, secondary, tertiary or quaternary amino units and have a molecular weight of 500 to 2 million.

U.S. Pat. No. 3,589,978 discloses quaternary ammonium polygalactomamman gum ethers which are prepared by reacting the gums with reactive quaternary ammonium compounds. The starting polygalactomannan gums may be guar gum and locust bean gum.

The starting quaternary ammonium compounds particularly suitable may be defined by the following formula:

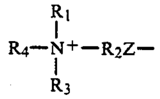

where $R_1$, $R_2$ and $R_3$ are selected form the group consisting of alkyl, substituted alkyl, alkene, aryl and substituted aryl groups, Z— is an anion and $R_4$ is selected from the group consisting of epoxylakyl and halohydrin groups. Illustrative of anion Z— are CL—, Br—, 1— and $HSO_4$—.

U.S. Pat. No. 3,910,862 is directed to copolymers of vinyl pyrrolidone containing quaternary ammonium groups. The copolymers are prepared by heating a solution comprising vinyl pyrrolidone and a dilower alkylaminoalkyl acrylate or methacrylate in a solvent therefor in the presence of a free radical initiator at temperatures ranging from about 30° C. to about 100° C. for a sufficient period of time to substantially effect copolymerization, and thereafter admixing the copolymer with a quaternizing agent to quaternize the resulting copolymer.

U.S. Pat. No. 4,292,212 teaches a cationic derivative of a 3—trimethylamino—2 hydroxypropyl guar chloride salt. This material contains as the basic unit two mannose units with a glycosidic linkage and a galactose unit attached to one of the hydroxyls of the mannose units. On average, each of the sugar units has three available hydroxyl sites. The hydroxyl groups of the guar are reacted with certain reactive quaternary ammonium compounds to produce the cationic polymers. The quaternary ammonium compounds are commercially available as Cosmedia ® c-261 cationic guar.

Suitable originally water-soluble or water-insoluble PQUATs for the purposes of this invention preferably have an average molecular weight of at least about 200, preferably at least about 300 and more preferably of at least 1000. The upper limit of the average molecular weight of the PQUATs is basically meaningless and may be, for example, up to 10 million or at even far higher values. This is clear from the water insolubility requirement which the PQUATs have to satisfy in accordance with the invention. If this is assured, no upper limits are set on the molecular weight.

After suitable preparation, for the purposes of the invention, which will be described in more detail hereinafter, suitable PQUATs, initially water soluble but subsequently immobilized on an insoluble carrier, include all polymers which have quaternary ammonium groups either in the polymer chain or attached to the polymer chain. Such quaternary ammonium gorups can also be derived from cyclically bonded nitrogen. Examples of such quaternary ammonium groups include corresponding numbers of 5- or 6- membered ring systems, e.g., morpholine, piperidine, piperazine or indazole rings. Numerous examples of such water-soluble PQUATs are described in greater detail, for example, in U.S. Pat. No. 4,240,450.

Homopolyers or copolymers containing cyclic units of the type described in U.S. Pat. No. 3,912,808 are particularly suitable herein. For example, the homopolymer of dimethyldiallylammonium chloride sold under the tradename Merquat® 100, and the copolymer of dimethyldiallylammonium chloride and acrylamide sold under the trade name Merquat® 550 (Quaternium 41) have this structure.

Other particularly suitable PQUATs include, for example, cellulose ethers wherein the anhydroglucose units each contain from 1 to 3 substituent containing quaternary ammonium groups attached via ether oxygen. Polymers such as these are known, for example, from U.S. Pat. No. 3,472,840. A commercial product having this structure is, for example, Polymer-JR® 400.

Other particularly suitable cationic polymers include, for example, the quaternary polyvinylpyrrolidone copolymers disclosed in U.S. Pat. No. 3,910,862 and commercially available, for example, under the tradename Gafquat® 734 and 755, and the quaternary polymeric urea derivatives disclosed in U.S. Pat. No. 4,157,388, and available, for example, under the tradename Mirapol® A15. Other suitable copolymers with polycationic characteristics include the polyacrylamide copolymers described in European Patent Application No. 0,153,146, laid open for public inspection, which in particular, in addition to at least 50 mol-% acrylamide units, contain up to 50 mol-% of a quaternized aminoalkyl ester of acrylic acid or methacrylic acid. These copolymers are water-soluble. They are applied therein to cloths based on cellulose fibers and become attached thereto on the basis of their natural attractive capacity. Cloths of this type can be washed out and are then to be used, together with anionic surfactant-free surfactant systems, for cleaning hard surfaces, especially for glass cleaning. Under these conditions they are characterized by an increased soil uptake capacity. However, the cleaning cloths mentioned in the document are suitable for the use in customary surfactant laundry and detergent baths intended in accordance with this invention, which may also be exposed to temperature loads of up to about 95° C. Considerable portions of the numerous PQUAT copolymers described in the document are released into the wash bath, are attracted to the material to be cleaned, and lead to increased pigment contamination there. Only the conversion of such PQUATs into the physical state that will be mentioned below in accordance with this invention can convert them to cleaning enhancers in accordance with this invention.

Preferred PQUATs in accordance with this invention are those compounds which, in solid form, are difficult to dissolve in water. Cationic polymers such as these are, more preferably, the polygalactomannan derivatives known, for example, from Great Britain Pat. No. 1,136,842. Galactomannans are polysaccharides which occur in the endosperm cells of many leguminosae seeds, but that are only obtained on an industrial scale from locust bean gum, guar gum and tara gum. They are made up of a linear mannan main chain, consisting of manopyranose building blocks which are attached by B-(1,4)-glucoside bonds and to which individual galactopyranose residues are fixed as branches by -(1,6)-glycoside bonds. The individual polygalactomannans differ from one another primarily in their mannose-galactose ratio. The cationic derivatives of the polygalactomannans are prepared by reacting hydroxyl groups of the polysaccharide with reactive quaternary ammonium compounds. Suitable reactive quaternary ammonium compounds include, for example, those of the following general formula:

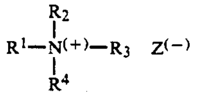

wherein $R^1$, $R^2$ and $R^3$ represent, for example, methyl or ethyl groups, and $R^4$ represents an epoxyalkyl group corresponding to the formula

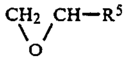

or a halohydrin group of the formula

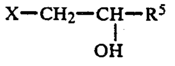

Wherein $R^5$ is an alkylene group with 1-3 carbon atoms, X is chlorine or bromine, and $Z^{(-)}$ is an anion, such as, for example chloride, bromide, iodide or hydrogen sulfate. The degree of substitution should be at least about 0.01 and preferably at least about 0.05, and typically falls between about 0.05 and about 1. A particularly suitable quaternary ammonium derivative of a polygalactomannan is, for example, guarhydroxypropyl trimethylammonium chloride, which contains cationic groups of the formula $$[CH_2—CH(OH)—CH_2—N^{(+)}—(CH_3)_3]Cl^{(-)}$$

bonded to the oxygen atoms of the hydroxyl groups of the polysaccharide. Such cationic guar derivatives are marketed, for example, under the tradename of "Cosmedia Guar C 261". The degree of substitution (DS) of Cosmedia Guar C261 is about 0.07. The commercial products "Jaguar C-13" (DS=0.11-0.13) and "Jaguar C 13 S" (DS=0.13) also belong to this type.

In the following will be described the manner in which cleaning-enhancing and particulate soil-collecting auxiliaries in accordance with this invention are produced from all of these or from other comparable, inherently swellable PQUAT starting materials.

Basically, the soil-collecting detergency enhancer used in accordance with this invention may be used in any physical form which enables the detergency enhancer to be charged with soil particles and then manually and/or mechanically removed in undissolved form from the washed fabrics. The PQUATs of the correspondingly PQUAT impregnated insoluble solid materials may be used in particular in two physical forms, namely in the form of sheet-form materials, particularly sheets, films or cloths, and on the other hand in the form of a finely divided solid material which may be dispersed, for example, in the wash liquor during the washing process, but which may be removed with the wash liquor on completion of washing and thus separated from the washed fabrics and, ultimately, from the regenerated wash liquor as well.

For washing fabrics, particularly by machine, the new detergency enhancers according to the invention may be used in two specific forms, namely: on the one hand, the auxiliaries according to the invention may be incorporated, preferably in the form of fine powders, in typical fabric detergents; on the other hand, the soil-laden wash liquor may be separately treated in a fixed bed of the auxiliaries according to the invention. Particulars of the first embodiment can be found in the earlier application cited above, i.e., International Patent Application PCT/EP/86/753.

The separate treatment of the soil-laden wash liquor in a regenerating step in accordance with the invention comprises, for example, passing the liquid phase to be regenerated either once or repeatedly through a solid filter which contains the insoluble PQUATs or the PQUATS immobilized on insoluble solids. The other insoluble auxiliaries mentioned above based on strongly oleophilic materials or on polyanionic solids may be used either at the same time or in separate regenerating steps.

Any inorganic and/or organic, insoluble material may be used as an insoluble carrier for the fixation of PQUATs and hence for the immobilization of these soil-collecting active components. Suitable organic materials include, for example, those of vegetable origin which may be more or less finely divided. Sawdust is mentioned as one example of a particularly finely divided material while suitable vegetable origin carrier materials include plant residues such as straw, shavings and the like. These carriers may be pretreated to remove any components which could give rise to problems during the subsequent treatment in detergent solutions.

Suitable inorganic carriers include insoluble and, in particular, finely divided salts, oxides, silicates and the like. These substances may be of natural and/or synthetic origin. Particularly suitable inorganic carriers include, for example, aluminosilicates of the zeolite type or zeolite-like compounds, particularly sodium zeolite A which is now widely used in detergents. However, it is also possible instead to use zeolite A in exchanged form, for example in the form of the calcium salt.

A particularly suitable class of mineral carriers include swellable, very finely-divided materials of the clay type, and/or the swellable layer silicate type, more especially smectites. Swellable inorganic materials of this type are distinguished by a particularly large surface area in the swollen state. This results in considerable activation of the detergent effect of the PQUATs used. In overall terms, it may be preferable to use insoluble, PQUAT-impregnated finely divided components having a surface area of at least 1 $m^2/g$ and preferably of at least 2 $m^2/g$. The external surface area of detergentgrade crystalline zeolite A is normally between 3 and 4 $m^2/g$. This material may form a suitable base either as is or in ion-exchanged form. However, materials having a much larger surface area, as is the case for example with the smectite clays, particularly montmorillonite, hectorite and/or saponite, may also be used with particular advantage. Materials such as these can have specific surface areas of up to 700 $m^2/g$ or even larger. All these various materials are particularly effective auxiliaries for taking up the loosened soil.

The application of soluble PQUAT compounds to insoluble carriers and, at the same time, the activation thereof may be promoted in particular by the simultaneous use even here of anionic surfactant components. The anionic surfactant may be applied in admixture with the PQUAT and then to treat the carrier thus prepared with the anionic surfactant. It is also possible initially to apply a coating of anionic surfactant to the carrier and then to deposit PQUAT on that coating. In each case, it has been found that the effectiveness of soil collectors thus treated is substantially enhanced. In a preferred embodiment, the anionic surfactant component is used in at least such a quantity that a substantial proportion of the quaternary ammonium groups, for example at least about 50 mol %, is able to react with the anionic surfactant. It may be preferred to use at least substantially equimolar quantities of anionic surfactant and PQUAT and, in one embodiment of the invention, the anionic surfactant may be used in a stolchlometric excess over and above the quaternary ammonium groups available.

In the case of stolchlometric or approximately stolchlometric quantities of the anionic surfactant components, as a general rule the corresponding anionic surfactant salt forms on the quaternary ammonium group. Such PQUAT anionic surfactant salts generally show a greatly reduced water solubility. Corresponding precipitates form; see in this connection, as for example, German Preliminary Published Application NO. 22 42 914. Such anionic surfactant salts of PQUATS have been suggested as antistatic agents for application to fibers. However, it is often known in this connection that excesses, especially considerable excesses, of the anionic surfactant can cause redissolution of the initially precipitated PQUAT-anionic surfactant salt, see in this connection the publication in Slefen-Ole-Fett-Wachse 1985, pp. 529–532 and 612–614. Especially in the reaction diagram on p. 530 of the above citation, the formation of solubilized micelle systems of the anionic surfactant/-PQUAT component in the presence of an excess of the anionic surfactant is shown. Anionic surfactants particularly suitable for this purpose are, for example, corresponding alcohol sulfates and/or alcohol ether sulfates, for example the known fatty alcohol sulfates and/or fatty alcohol ether sulfates which are derived from natural and/or synthetic fatty alcohols containing from 10 to 22 carbon atoms and more especially from 12 to 18 carbon atoms and which contain corresponding residues of ethylene glycol or ring-opened ethylene oxide as intermediate ether or polyether groups.

In another preferred embodiment of the invention, the PQUAT-containing layer is formed as thinly as possible on the insoluble solid so that the insoluble carrier and the PQAUT-containing coating material are mixed in ratios which enable the PQUAT-containing material to be optimally spread in the form of a very thin layer over the surface of the insoluble carrier material. Naturally, optimal use is made in this embodiment of the quaternary ammonium groups of the component which collects suspended soil particles.

Sheet-form embodiments of the new soil collector may be made by methods known per se as nonwovens, woven or knitted cloths, as a preferably open-cell foam sheet, as a closed film or in any other form. The only requirement is that the surface over which the wash liquor flows should contain the PQUATs in a sufficient quantity to contact and collect the soil particles.

For all embodiments of the new detergency enhancer according to the invention, the PQUATs used should be substantially insoluble in water or insoluble in the wash liquor to such an extent that the surface of the detergency enhancer in whatever form it is used can become charged with soil particles and retain them until the regeneration process is over. Insoluble PQAUTs can be crosslinked by reaction with at least bifunctional crosslinking agents to such an extent that they become sufficiently insoluble in water for the purposes of the invention. The selection of a suitable crosslinking agent in each case is determined by the structure of the compounds to be crosslinked taking into consideration knowledge of the general chemical subject matter.

A basically different approach, but one which ultimately produces the same result, comprises subsequently applying quaternary ammonium groups to the surface of preferably already formed, insoluble carrier compounds. Thus, for example, in accordance with known methods, the surface of insoluble or insolubilized, formed natural materials and/or corresponding synthesis products can be supplied with quaternary ammonium groups by chemical reaction. Process steps for this purpose are similar to those known in principal from the above cited literature for the production of water-soluble and/or water-swellable PQUATs. By way of example, this may be illustrated as follows wherein a sheet-form structure such as a nonwoven or a woven or knitted cloth based on natural fibers and/or synthetic fibers may be converted into the desired soil-collecting detergency enhancer by reaction with a coupling component, for example epichlorohydrin, and subsequent reaction with a basic nitrogen compound, followed by quaternization, to the desired soil-collecting laundering power enhancer. The same also applies to granular or powder-form material made from natural and/or synthetic water-insoluble starting materials. Other suitable reactive quaternization agents are the quaternary ammonium compounds described in connection with the previously mentioned British Pat. No. 1,136,842, having a reactive epoxy group, or their reaction products with hydrogen halides to form the corresponding halohydrin group.

Especially readily accessible and economical starting materials for such a reactive surface modification, insoluble in laundering and cleaning baths of the type mentioned, are natural substances such as cellulose, insoluble cellulose derivatives, and other insoluble or insolubilized polysaccharide-like natural materials or their derivatives. The introduction of quaternary ammonium group-containing residues proceeds without problems here since the polysaccharide components used as carriers are either initially insoluble, for example, in the case of cellulose, or can be readily converted to the insoluble state by simple chemical reactions, for example with polyfunctional crosslinking agents. A decisive factor in the teaching of this invention is that it is completely sufficient for the suitability of the cleaning enhancers if the quaternary cationic groups are located on the surface of the formed cleaning enhancer, even though the existence of corresponding groups in deeper material layers is not eliminated. Precisely for reasons of accessibility and price, particular importance is attributed to such especially easy and economical to manufacture cleaning enhancers.

This viewpoint can even be influenced by the selection of the forming method. A granulate or powdered solid material selected on the basis of natural materials is usually easier and thus less expensive to obtain than a sheet structure, for example in the sense of woven or knitted cloth. For practical use in the sense of woven or knitted cloth. For practical use in the laundering process as well, the employment of such granular or powdered cleaning enhancers with insolubly finished polycationic surfaces can have a special significance. As was previously demonstrated in connection with the teaching of British Pat. No. 1,136,842, even very low average degrees of substitution in the surface of the natural material or natural material derivative lead to effective results in the process in accordance with the invention. Thus it has proven completely adequate, for example, for the use of formed quaternized polysaccharides or polysaccharide derivatives, to work with average degrees of substitution not exceeding 0.5, and especially not exceeding about 0.35. For the cleaning enhancement within the framework of textile launderings, it is particularly advantageous to utilize an average degree of substitution of up to about 0.12 and preferably below 0.1. In general, the average degree of substitution in the range of about 0.01 will be regarded as the lower limit, wherein particularly good results can be obtained in the range of from about 0.015 to 0.08 and especially from about 0.02 to 0.07. It is surprising that fine cellulose powders of such low degrees of substitution cause a substantial enhancement of the laundering power, especially in textile laundering, even when the wash bath is reused repeatedly.

Particular practical significance may be attributed to those embodiments in which PQUATs are immobilized, preferably in a thin layer, on the surface of a water-insoluble sheet-form or granular carrier by physical or chemical fixing in such a way that they are unable to escape into the wash liquor to any significant extent, if at all, during the regeneration process.

It may therefore be desirable to provide a stronger, namely reactive bonding of the PQUAT coating mass to the insoluble carrier. Here, in a known manner, once again a chemical bonding by means of bifunctional coupling components can come into consideration. However, the following method is also of importance for an embodiment in accordance with the invention, i.e., the fixing of a polymeric PQUAT coating on a formed substrate can be provided wherein anionic groups are formed or exist in or on the surface of the base body. Examples of such anionic groups are carboxyl groups, which can be introduced for example by carboxymethylation into the surface of the base body, or other acid groups such as sulfonic acid groups. More detailed statements may be found in the aforementioned U.S. Pat. No. 3,694,364. The cationic PQUAT coating thus attached itself firmly in the manner of a salt to these counter-ions of the matrix, so that in this manner the solidified bond between insoluble solid and applied PQUAT layer is created. Merely as an example for this embodiment, a carrier based on cellulose fibers may be mentioned, wherein free carboxyl groups have been introduced into the cellulose molecule. This is possible, for example, in two different ways:

by physical incorporaiton of compounds containing carboxyl groups in the viscose, i.e., in a cellulose dissolved as cellulose zanthogenate, to form socalled incorporated cellulose fibers; or by chemical reaction such as etherification of the fiber forming cellulose of the reagents containing carboxyl groups to form cellulose fibers modified throughout by, for example, carboxyalkyl groups corresponding to the following formula $$-(CH_2)n-COOH,$$

wherein n may have a value of from 1 to 3.

The physical incorporation of compounds containing carboxyl groups in the viscose may be obtained, for example, by the addition of alkali metal salts of acrylic acid homopolymers, acrylic acid-methacrylic acid copolymers; methyl vinyl ether-malic anhydride copolymers, alginic acid or carboxymethyl cellulose, to the viscose solution and subsequent spinning into a precipitation bath in the usual way. Products based on cellulose fibers such as these and on fibers modified by carboxymethyl groups are commercially available for numerous applications. In the present embodiment, such fibers or carrier materials prepared therefrom may be coated with an insoluble PQUAT layer and hence permanently attached thereto for the application under consideration.

A particularly simple insoluble bonding between an inherently inert carrier and an applied insoluble PQUAT layer can be accomplished by the so-called encapsulation principle. If for example an inert insoluble carrier in fine granular form is enveloped with a PQUAT layer, preferably in such a manner as to cover the surface, and this PQUAT layer is then modified to the required state of insolubility under laundering conditions, in this case as well the inseparable combination between the inert support core and the enveloping PQUAT layer is brought about, even if no particular bonding forces exist between these two materials. The conversion of the PQUAT layer to the insoluble material can take place, for example, once again via the chemical route by cross-linking this surrounding material layer. Understandably, the use of this encapsulation principle is not limited to granular detergency enhancers.

However, it is not only water-insoluble organic materials which are suitable as carriers for the soil-collecting PQUAT layer. Particular significance is also attributed to inorganic carriers. In this embodiment, particularly suitable water-insoluble inorganic carriers are those of the type which have already been used in washing processes and particularly in fabric washing processes. Typical examples of inorganic carriers of this type are natural or synthetic, finely divided aluminosilicates of the bentonite or synthetic crystalline zeolite type, more especially, detergent-quality zeolite A which is widely used as a phosphate substitute, zeolite X and zeolite P. Other examples of suitable carrier materials include silica, particularly coloidal silica of the Aerosil ® type, finely divided, swellable or even non-swellable layer silicates, particularly of the montmorillonite type, water-insoluble finely divided metal oxides and/or hydroxides and corresponding metal salts. Alkali metal salts, such as calcium carbonate, calcium sulfate and the like, or aluminm oxide and the like are such examples. It can be of particular advantage to use acidic or polyanionic inorganic carrier materials, for example of the aluminosilicate, layer silicate, or silica gel type. In this case, too, particularly firm anchorage of the soil-collecting PQUAT layer is guaranteed by the possibility of salt formation between the PQUAT coating composition and the inorganic carrier with its opposite charge.

The quaternary ammonium group in the PQUAT components used in accordance with the invention preferably contains from 1 to 3 lower alkyl radicals each containing from 1 to 6 and more especially from 1 to 3 carbon atoms. Particular importance is attributed to the quaternary ammonium group which contains from 1 to 3 alkyl radicals and, as counter-ion, residues of acids of the type normally encountered in the washing process. Examples of such a counter-ion which may be mentioned include chloride and/or sulfate, although these change to the corresponding anionic surfactant salt group in the presence of anionic surfactants, see the mentioned references German Preliminary Published Application No. 22 42 914 and SFOEW (Selfen-Fette-Oele-Washse) 1985, p. 530. As was previously mentioned, such PQUAT/anionic surfactant salt groups can already be formed in the detergency enhancer in accordance with the invention prior to its introduction into the wash bath.

In a modified embodiment of the invention as described thus far, insoluble PQUATs and/or PQUATs immobilized on insoluble solids, in which the quaternary ammonium groups characteristic of this class of compounds are at least partially replaced by non-quaternized basic amino groups, more especially by tertiary amino groups, may be used as soil-collecting detergency enhancers. This modified embodiment corresponds to the basic embodiment of the invention in all other respects. The basis for this modification is the observation underlying this embodiment of the invention that polycationic components and particularly cationic polymer compounds of the type which derive their suitability only partly, if at all, from quaternary ammonium groups, but instead from other basic amino groups, may also be used for the purposes of the invention. The preferred non-quaternary basic amino group is the tertiary amino group. It has been found that polycationic compounds of this type are also capable by taking up suspended soil particles from the wash liquor. Polycationic tertiary amino compounds of this type may also be used by themselves as at least substantially insoluble solids or as basically soluble or swellable components which in turn are immobilized on, i.e. fixed to, sufficiently insoluble carrier materials. The content of quaternary ammonium groups here preferably amounts to at least about 5% based on the total of quaternary and nonquaternary base groups.

A typical example of polycationic compounds of the aforementioned type is the GAF "Copolymer 937 ®", which is a PVP/dimethylaminoethyl methacrylate copolymer having an average molecular weight of approximately 1,000,000. The use of PQUAT coatings in the narrower sense of truly polyfunctional quaternary ammonium compounds in admixture with polycatonic compounds completely or partly modified in this respect falls within the scope of the invention.

The particular quantity of soil-collecting PQUAT used in the narrower or broader sense of the invention is determined by the particular determinable conditions or circumstances prevailing in each individual case. They may readily be determined by the expert through simple tests. The quantity of soil-collecting PQUAT used in a particular washing process is preferably selected in such a way that at least a substantial portion, i.e, for example at least about 50% and preferably at least about 75% of the expected charge of suspended soil particles in the wash liquor can be taken up by the soil-collecting detergency enhancer. It may be desirable to use formulations which release such a quantity of PQUAT in the washing liquor that surplus capacity of the PQUAT is available for covering occasional peaks in the soil load from different washing processes.

The soil uptake capacity of the soil-collecting detergency enhancers is in turn determined in particular by the quantity of functional quaternary ammonium groups or similarly acting basic amino groups, particularly tertiary amino groups which is made available in each individual case. In this case, therefore, the degree of substitution of the particular PQUAT used has to be taken into account. On the other hand, the surface of the detergency enhancer insoluble in the wash liquor is another important variable which enters into the present considerations. Naturally, therefore, it can be of advantage in accordance with the invention to use the soil-collecting detergency enhancer in forms which are distinguished by a particularly large surface area. On the one hand, it is possible to use the soil-collecting detergency enhancer in highly disperse distribution, for example, in the form of solid particles having an individual particle size of up to about 1 mm and preferably below 100, especially below 40 and more preferably below about 10μ as known for detergent builders based on zeolite A or for finely dispersed silicas. On the other hand, however, high surface areas are also provided by sheet-form materials of fibers or bundles of fibers. Knowing the particular characteristics of the detergency enhancers used in accordance with the invention and the expected soil load, it is readily possible to determine the minimum quantity of soil-collecting detergency enhancer required for each individual case.

In the following examples, the determination of the laundering power of the detergent formulations used was performed on known artificially soiled test fabrics on the basis of different fibers and soils which are customarily used today for the testing and development of detergent formulations, and which to some degree are commercially available or are manufactured by the detergent industry according to their own specifications. Known manufacturers of corresponding commercial, artificially soiled test fabrics include EMPA, Eldgenösslsche Materialprüfungs- und Versuchsanstalt (Federal Material Testing and Research Institute), Unterstrasse 11, Ch-9001 St. Gallen; Wäscherel-Forschung Krefeld, WFK-Testgewebe - GmbH, (Krefeld Laundry Research Group, WFK Test Fabric Company), Adlerstrasse 44, D-4150 Krefeld; Testfabric Inc., 200 Blackford Ave., Middlesex, N.J. USA.

Unless specifically mentioned otherwise, the laundering experiments for determining the primary laundering power were performed with soiled standard test pieces comprised of polyester-cotton-finished, soiled with pigments and sebum (H-SH-PBV). The degree of soiling of the untreated starting material and the laundered fabric samples is determined by measuring the remission with an Elrephomat DSC 5 (Carl Zeiss, Oberkochen, FRG). The degree of soiling of the PBV test fabric used, determined in this way, amounts to 30.0 (% remission).

The laundering experiments were performed in the Launderometer. The respective working conditions are given in connection with the examples.

EXAMPLE I

Non-finished, white cotton swatches (11×13 cm, weight about 2 g) were moistened with 2 g of the following active ingredient solution in each case, then dried in air for several days:

0.5 wt-% PQUAT (Cosmedia Guar C 261)

53.6 wt-% synthetic surfactant based on fatty alcohol ether sulfate (FAES)+base (15% detergent, "Texapon N 25")

0.2 wt-% preservative based on bromo-5-nitro 1,3-dioxane ("Bronidox L")

45.7 wt-% water.

These PQUATS contain cleaning enhancers and were used in laundering experiments in the Launderometer for repeated recycling of a wash bath under standard laundering conditions with standardized soiled fabrics.

Detergent addition: 5 g/l of a commercial standard detergent

Launderometer conditions: 60° C., 16° dh, 10 steel balls, washing 30 minutes, rinsing 4×30 seconds Bath ratio: 1:30

Loading: In a first experimental series, two standardized soiled swatches (H-SH-PBV) were laundered together with two untreated filler fabric pieces. In a parallel experiment, two corresponding standardized soiled swatches (H-SH-PBV) were laundered together with two filler swatches finished with the previously mentioned PQUAT formulation.

Working and comparison conditions: After completion of the first wash cycle, the washed material was separated from the wash liquor; however, the wash liquor was not discarded, but was saved for subsequent laundering. The laundering and brightening results established during the first laundering were ascertained by determining the remission.

In a subsequent, second laundering, the two wash liquors removed from the first laundering process were reused, adding new standardized soiled fabric and a number of non-soiled filler fabrics comparable to those of the first laundering process. Then once again the wash liquor was separated from the material to be washed, and the brightening of the laundered material was measured by determining the remission. The results are summarized in Table 1, as follows.

TABLE 1

| Bath (1:30) | 1 | 2 |
|---|---|---|
| 1. Laundering loading | 2 H-SH-PBV + 2 filler swatches | 2 H-SH-PBV + PQUAT impregnated filler swatches |
| % remission | 68.7 | 73.2 |
| Appearance of the filler swatch | white | dark gray |
| 2. Laundering loading | 2 H-SH-PBV + 2 filler swatches | 2 H-SH-PBV + 2 filler swatches |
| % remission | 40.2 | 66.1 |
| appearance of the filler swatch | white-light gray | white |

The numerical comparison shows the following: In the second laundering with the wash liquor, used but purified by simultaneous use of PQUAT practically the same brightening was achieved as in the first laundering without the use of the laundering power-enhancing PQUAT.

EXAMPLE II

In two experimental series ("Series 1" and "Series 2") comparative laundering experiments were performed in the Launderometer. The corresponding process conditions for all laundering experiments were as follows: Launderometer, 60° C., 16° dh, bath ratio 1:30, 10 steel balls, H-SH-PBV fabric (2 soiled swatches, 2 filler swatches), 30 minute laundering, 4×30 second rinsing.

Three different wash baths were used in both series:

(a) 3 g/l of a commercial powdered complete detergent—designated as "WM" in Table 2 below.

(b) Wash bath in accordance with (a), to which 1.2 g (active ingredient)/l of the FAES-based surfactant according to Example 1 had been added.

(c) Wash bath according to (a); however, in place of the 2 filler fabrics, 2 cotton swatches were simultaneously used here, which according to the procedure of Example I were impregnated with PQUAT (Cosmedia Guar C 261) and the FAES-based surfactant ("Texapon N 25"). The FAES-surfactant quantity introduced in this form corresponds to the surfactant quantity added in the wash bath according to (b), but with the modification that it was present together with PQUAT as impregnation on the cotton swatches.

The three wash baths according to (a), (b), and (c) were tested in terms of their laundering effect in repeated laundering, i.e., in five successive laundering experiments, each using the same wash liquor. In these five successive launderings, in each case the H-SH-PBV soiled fabric to be cleaned was freshly added.

The brightening values (% remission) determined on the laundered test swatches are summarized in Table 2, which follows.

TABLE 2

| | WM* Series 1 | WM* Series 2 | WM* +1.2 g FAES Series 1 | WM* +1.2 g FAES Series 2 | WM* + collector Series 1 | WM* + collector Series 2 |
|---|---|---|---|---|---|---|
| 1. laundering | 59.7 | 59.7 | 66.9 | 66.4 | 58.7 | 57.3 |
| 2. laundering | 35.7 | 37.8 | 64.9 | 63.6 | 66.7 | 66.4 |
| 3. laundering | 32.9 | 33.8 | 55.3 | 52.1 | 64.3 | 63.6 |
| 4. laundering | 32.1 | 33.7 | 44.3 | 43.9 | 50.1 | 60.2 |
| 5. laundering | 32.6 | 33.4 | 41.3 | 42.0 | 58.5 | 60.0 |

*WM = detergent formula

The laundering results obtained and their simultaneous use of the PQUAT-surfactant-saturated swatches, designated as "collectors", are still surprisingly good even during the fifth reuse of the wash bath, while the laundering power of the wash bath under (a) has reached a lower limiting value already during the third washing. The addition of FAES-surfactant (baths b), to be sure, leads to an initial increase in the laundering power, but this drops by about 25 remission units in the course of the five repeated launderings.

EXAMPLE III

Once again serial laundering experiments were performed under the following standard conditions: launderometer, 30° C., 16° dh, bath ratio 1:30, 10 steel balls, H-SH-PBV fabrics, 30 minute washing, 4×30 second rinsing.

Five washings with the used wash bath, but in each case new test fabrics (2-H-SH-PBV/2 filler fabrics).

In a first experimental group, the performance of different wash baths based on a powdered commercial complete detergent (called "WMP" in the following), Experiments (a) to (g) was determined.

In a comparable experimental series, the behavior of corresponding wash baths based on a commercial liquid complete detergent (designated as "WMF") was investigated—Experimental Series (h) to (n).

The PQUAT used was fine particulate cellulose with an average degree of substitution (MS) of 0.05. Once again a fatty alcohol ether sulfate ("Texapon N 50") was used as an additional anionic surfactant component.

The two experimental series (a) to (g) and (h) to (n) were further subdivided as follows:

First the blank values were determined with the pure detergent baths (a) and (h). Then in a first experimental group the additives (b to d and l through k) were added during the first laundering, and then not replaced in the subsequent launderings.

In a second experimental series (e) through (g) and (l) through (n), fresh additive was added to the used wash bath before each laundering.

Specifically, the following conditions apply for the wash baths (a) through (n) as shown in Table 3 which follows:

TABLE 3

| | | | |
|---|---|---|---|
| a = | 3 g WMP/l | | |
| b = | 3 g WMP/l + 0.5 g (active substance = AS) FAES/l | | |
| c = | 3 g WMP/l + 1 g PQUAT | | |
| d = | 3 g WMP/l + 0.5 g (AS) FAES/l | + 1 g Eng. PQUAT/l | |
| e = | 3 g WMP/l + each laundering: | + 1 g PQUAT/l | |
| f = | 3 g WMP/l + each laundering: | + 0.5 g (AS) FAES/l | |
| g = | 3 g WMP/l + each laundering: | + 0.5 g (AS) FAES/l | + 1 g PQUAT/l |
| h = | 3 g WMP/l | | |
| i = | 3 g WMP/l + 0.5 g (AS) FAES/l | | |
| j = | 3 g WMP/l + 1 g PQUAT/l | | |
| k = | 3 g WMP/l + 0.5 g (AS) FAES/l | + 1 g PQUAT/l | |
| l = | 3 g WMP/l + each laundering: | + 1 g PQUAT/l | |
| m = | 3 g WMP/l + each laundering: | + 0.5 g (AS) FAES/l | |
| n = | 3 g WMP/l + each laundering: | + 0.5 g (AS) FAES/l | + 1 g PQUAT/l |

In the case of simultaneous use of FAES+PQUAT: Take PQUAT, moisten with FAES as 10% solution, shake slightly, let stand 10 minutes, then add to the detergent bath.

The laundering results obtained, determined as % remission are summarized in Table 4 as follows.

TABLE 4

| % Remission | a | b | c | d | e | f | g | h | i | j | k | l | m | n |
|---|---|---|---|---|---|---|---|---|---|---|---|---|---|---|
| After the | | | | | | | | | | | | | | |
| 1st laundering | 40.9 | 54.3 | 55.3 | 55.9 | 55.0 | 53.9 | 56.4 | 48.3 | 55.5 | 51.1 | 56.2 | 51.5 | 55.9 | 56.8 |
| 2nd laundering | 30.8 | 39.6 | 39.1 | 43.5 | 42.7 | 51.9 | 52.5 | 43.8 | 49.2 | 50.9 | 53.9 | 52.6 | 54.3 | 56.7 |
| 3rd laundering | 29.1 | 31.5 | 34.0 | 35.7 | 35.6 | 47.0 | 51.7 | 35.8 | 40.4 | 38.1 | 42.4 | 40.3 | 51.7 | 54.5 |
| 4th laundering | 27.4 | 28.2 | 31.5 | 34.5 | 30.8 | 46.5 | 50.5 | 31.7 | 35.9 | 34.8 | 36.8 | 36.5 | 48.4 | 49.6 |
| 5th laundering | 27.1 | 28.1 | 30.0 | 32.2 | 29.6 | 46.1 | 49.9 | 29.6 | 33.4 | 31.2 | 33.7 | 34.9 | 46.0 | 49.3 |

EXAMPLE IV

In an additional series of laundering experiments with reuse of the used laundering baths, in a first series (1 to 3) laundering baths on the basis of the powdered complete textile detergent "WMP" and in a second experimental series 4 through 6 corresponding laundering experiments on the basis of the liquid complete detergent "WMF" were used.

In this case also, the laundering power of the pure detergent bath was compared with that of a coresponding bath to which a predetermined amount of surfactant had been added, and a second comparison bath to which PQUAT plus surfactant had been added.

As the PQUAT in the present case, fine particulate cellulose (average particle diameter no larger than 50) with an average degree of substitution (MS) of about 0.1 was used. The co-surfactant used in this experimental series—Experimental Series 3/4 and 5/6—was a fatty alcohol ethoxylate ("Dehydol LT 7").

The working parameters used in all laundering experiments were as follows: Launderometer, 30° C., 16° dh, bath ratio 1:30, 10 steel balls, H-SH-PBV fabrics, 30 minute laundering, 4×30 second rinsing.

Six launderings with the used wash bath, but new test fabrics (per 2 H-SH-PBV, 2 filling swatches).

The composition of wash baths 1 to 6 is given in Table 5, which follows.

In the case of simultaneous use of surfactant and PQUAT : Take PQUAT, moisten with surfactant (as 10% solution), shake gently and allow to stand for about 10 minutes, then add to the laundering bath.

The laundering results obtained, determined as % remission, are summarized in Table 6, which follows.

TABLE 5

| |
|---|
| (1) 3 g WMP/l |
| (2) 3 g WMP/l + 0.3 g surfactant/l |
| (3) 3 g WMP/l + 0.3 g surfactant/l + 2 g PQUAT/l |
| (4) 3 g WMF/l |
| (5) 3 g WMF/l + 0.3 g surfactant/l |
| (6) 3 g WMF/l + 0.3 g surfactant/l + 2 g PQUAT/l |

TA8LE 6

| % Remission | (1) | (2) | (3) | (4) | (5) | (6) |
|---|---|---|---|---|---|---|
| 1st laundering | 55.5 | 69.4 | 58.3 | 56.6 | 61.0 | 60.5 |
| 2nd laundering | 37.9 | 54.7 | 49.7 | 46.8 | 57.3 | 54.0 |
| 3rd laundering | 32.1 | 37.1 | 46.6 | 41.1 | 48.5 | 51.1 |
| 4th laundering | 30.5 | 33.3 | 44.8 | 36.5 | 42.0 | 49.4 |
| 5th laundering | 30.1 | 31.2 | 37.4 | 33.5 | 37.6 | 43.6 |
| 6th laundering | 30.0 | 30.8 | 35.0 | 32.0 | 35.1 | 38.9 |

The results are of particular interest here:

To be sure, by adding the surfactant to the respective detergent bath alone, a considerable increase in the initial laundering power was first achieved, but this declined rapidly upon reuse of the same wash bath. The joint use of PQUAT and surfactant in the respective wash baths, to be sure, ultimately does not prevent the decline of the laundering power, but prolonged stabilization of still distinctly elevated laundering results can be observed. The fact that the laundering power ultimately also decreased here as well is not surprising. Through repeated removal of the laundered fabric and reintroduction of fresh textile material, detergent chemicals are unavoidably removed from the bath, so that the depletion of detergent components ultimately occurring must lead to a decline of the laundering power.

EXAMPLE V

Cellulose power with an average particle size of less than 50 was quaternized to an average degree of substitution (ADS) of 0.05 with 3-chloro-2-hydroxy propyltrimethyl ammonium chloride.

In two comparison series, on one hand a commercial powdered detergent without PQUAT added was used, and in a second experimental series, the corresponding surfactant bath, but with the addition of 1 g/l of quaternized cellulose.

In both cases the addition rate of the commercial detergent was 3 g/l. The PQUAT was added to the wash bath without prior activation by surfactant treatment.

The working conditions were as follows:

Launderometer, 60° C., 16° dH, bath ratio 1:30, 10 steel balls, H-SH-PBV fabric, 30 minutes laundering, rinsing 4×30 seconds.

Six launderings with the used laundering bath, but in each instance with new test fabrics (2 H-SH-PBV/2 filler fabrics).

The brightening values determined on the laundered test swatches, determined as % remission are summarized in Table 7 below.

Initially distinct enhancement of the laundering power due to addition of PQUAT in the first laundering is remarkable here, a result which is in agreement with the teaching of earlier International Patent Application PCT/EP/86/753. In the second laundering as well, in the presence of the PQUAT component, a readily usable laundering result is also obtained, which corresponds approximately to that of the first laundering without PQUAT addition. Then, however, the laundering power of the PQUAT-containing bath also drops off rapidly. It will undoubtedly be necessary to consider here the fact that the PQUAT, not pretreated with surfactant components, removes surfactant from the laundering bath in situ, and thus leads to relatively rapid depletion of essential detergent materials from the wash bath.

TABLE 7

| % Remission | Without additve | + PQUAT |
|---|---|---|
| 1st laundering | 47.8 | 56.3 |
| 2nd launderng | 32.5 | 45.5 |
| 3rd laundering | 32.0 | 35.6 |
| 4th laundering | 31.2 | 31.5 |
| 5th laundering | 30.6 | 32.4 |
| 6th laundering | 30.5 | 31.8 |

Nevertheless, in terms of trends, the laundering results are still better in the case of the fifth and sixth launderings in the presence of PQUAT than without addition of this auxiliary.

We claim:

1. The process of regenerating a particulate soil-laden detergent solution comprising contacting said solution with a soil collector comprising a polyfunctional quaternary ammonium compound which is at least substantially insoluble in said solution and/or immobilized on a solid correspondingly insoluble in said solution, said soil collector being in the form of a finely-divided solid.

2. The process in accordance with claim 1 wherein said detergent solution comprises an aqueous, alkaline solution.

3. The process in accordance with claim 1 wherein said step of contacting said solution with said soil collector is performed during the use of said solution.

4. The process in accordance with claim 1 wherein said step of contacting said solution with said soil collector is performed after the use of said solution.

5. The process in accordance with claim 1 including the step of re-using said detergent solution after contacting said solution with said soil collector.

6. The process in accordance with claim 1 wherein said soil collector is in the form of a bed of said finely-divided solid.

7. The process in accordance with claim 1 wherein said polyfunctional quaternary ammonium compound is initially water-soluble and is chemically and/or physically fixed to the surface of a water-insoluble carrier.

8. The process in accordance with claim 1 wherein said polyfunctional quaternary ammonium compound is fixed to the surface of an organic and/or inorganic carrier material.

9. The process in accordance with claim 1 wherein said polyfunctional quaternary ammonium compound is fixed to the surface of an inorganic carrier material selected from the group consisting of aluminosilicates, finely-divided salts, oxides, and silicates.

10. The process in accordance with claim 1 wherein said polyfunctional quaternary ammonium compound is fixed to the surface of an organic carrier material selected from the group consisting of sawdust, straw and vegetable origin shavings.

11. The process in accordance with claim 1 wherein said polyfunctional quaternary ammonium compound comprises oligomeric and/or polymeric polyfunctional quaternary ammonium compounds having an average molecular weight of at least about 300.

12. The process in accordance with claim 1 including contacting said soil-laden detergent solution with an insoluble solid having a high absorption capacity for oleophilic soil such as oils and/or fats.

13. The process in accordance with claim 1 including contacting said soil-laden detergent solution with an insoluble polyanionic solid.

14. The process in accordance with claim 1 including contacting said soil-laden detergent solution with an insoluble polyanionic solid containing a plurality of anionic groups selected from salt-forming organic and/or inorganic acid groups.

15. The process in accordance with claim 1 wherein said polyfunctional quaternary ammonium compound comprises a polygalactomamman derivative.

16. The process in accordance with claim 15 wherein said polygalactomannan derivative comprises guarhydroxypropyl trimethylammonium chloride containing cationic groups corresponding to the formula $$CH_2CH(OH)CH_2N^{(+)}(CH_3)_3Cl^{(-)}$$

attached to the oxygen atoms of the hydroxyl groups of the polysaccharide.

17. The process in accordance with claim 1 wherein said detergent solution contains surfactants selected from the group consisting of anionic surfactants and nonionic surfactants.

18. The process in accordance with claim 1 including pretreating said polyfunctional quaternary ammonium compound with an anionic surfactant.

19. The process in accordance with claim 18 wherein said polyfunctional quaternary ammonium compound is pretreated with at least a stolchlometric quantity of said anionic surfactant.

20. The process in accordance with claim 1 wherein said polyfunctional quaternary ammonium compound is fixed to finely divided, particulate cellulose and/or water-soluble cellulose derivatives.

21. The process in accordance with claim 1 wherein said polyfunctional quaternary ammonium compound is fixed to the surface of a polysaccharide carrier material and has an average degree of substitution not exceeding 0.5.

22. The process in accordance with claim 1 wherein said soil collector contains basic amino groups.

* * * * *

UNITED STATES PATENT AND TRADEMARK OFFICE
CERTIFICATE OF CORRECTION

PATENT NO. : 4,773,939

DATED : Sep. 27, 1988

INVENTOR(S) : Meffert et al.

It is certified that error appears in the above-identified patent and that said Letters Patent is hereby corrected as shown below:

On cover page, under [75] Inventors; add:

Johann F. Fues

At column 12, line 66, delete:

$-(CH_2)n-COOH.$

And insert:

$-(CH_2)_n-COOH,$

Signed and Sealed this

Twelfth Day of September, 1989

Attest:

DONALD J. QUIGG

*Attesting Officer*

*Commissioner of Patents and Trademarks*